United States Patent
Smits et al.

(10) Patent No.: US 12,075,170 B2
(45) Date of Patent: Aug. 27, 2024

(54) METHOD OF GENERATING INFRARED IMAGE

(71) Applicant: Aptiv Technologies AG, Schaffhausen (CH)

(72) Inventors: Soeren Smits, Neustadt (DE); Ulrich Pitz, Siefersheim (DE); Stepan Pazekha, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/819,586

(22) Filed: Aug. 12, 2022

(65) Prior Publication Data

US 2023/0074718 A1 Mar. 9, 2023

Related U.S. Application Data

(60) Provisional application No. 63/236,430, filed on Aug. 24, 2021.

(30) Foreign Application Priority Data

Jul. 22, 2022 (EP) .................................... 22186391

(51) Int. Cl.
*H04N 25/131* (2023.01)
*H04N 9/64* (2023.01)
*H04N 23/56* (2023.01)
*H04N 23/76* (2023.01)

(52) U.S. Cl.
CPC ............. *H04N 25/131* (2023.01); *H04N 9/64* (2013.01); *H04N 23/56* (2023.01); *H04N 23/76* (2023.01)

(58) Field of Classification Search
CPC ........ H04N 25/131; H04N 9/64; H04N 23/56; H04N 23/76; H04N 23/11; H04N 23/843
See application file for complete search history.

(56) References Cited

U.S. PATENT DOCUMENTS

2010/0165110 A1* 7/2010 Ohara .................... H04N 23/80
  348/E5.09
2010/0289885 A1* 11/2010 Lu ......................... H04N 23/843
  348/61

FOREIGN PATENT DOCUMENTS

| EP | 2523160 A1 | 11/2012 |
| EP | 3493261 A2 | 6/2019 |
| WO | 2021014764 A1 | 1/2021 |

OTHER PUBLICATIONS

"Extended European Search Report", EP Application No. 22186391.3, Jan. 5, 2023, 7 pages.

* cited by examiner

Primary Examiner — Mekonnen D Dagnew
(74) Attorney, Agent, or Firm — Harness, Dickey & Pierce, P.L.C.

(57) ABSTRACT

The method comprises a step of processing pixel values provided at the output of an image sensor comprising a two-dimensional array of pixels including a mix of IR pixels and color pixels. The step of processing includes, for each color pixel, determining a local color-related ratio indicative of a part of infrared light reception in the color pixel, and estimating an infrared portion value from a color pixel value based on the local color-related ratio. The method further includes generating an infrared image from pixel values from the IR pixels and the estimated infrared portion values from the color pixels.

17 Claims, 6 Drawing Sheets

METHOD OF GENERATING INFRARED IMAGE

CROSS-REFERENCE TO RELATED APPLICATIONS

This application claims priority to European Patent Application Number 22186391.3, filed Jul. 22, 2022, which claims the benefit of U.S. Provisional Patent Application No. 63/236,430, filed Aug. 24, 2021, the disclosures of which are incorporated by reference herein in their entireties.

BACKGROUND

Industrial applications of various imaging devices broaden every year due to expanding capabilities of image processing algorithms and machine learning to solve complex tasks related to inspection, control, human machine interaction and others. In the automotive industry, recent safety standards require camera systems to integrate in vehicles to provide surveillance and driver condition monitoring in both day and night conditions.

Most of camera or imaging systems have cut out filters. For example, monochromatic infrared (IR) image sensors are configured to completely cut out visual spectrum range, and RGB image sensors are configured to completely cut out IR spectrum range.

Figure 1:
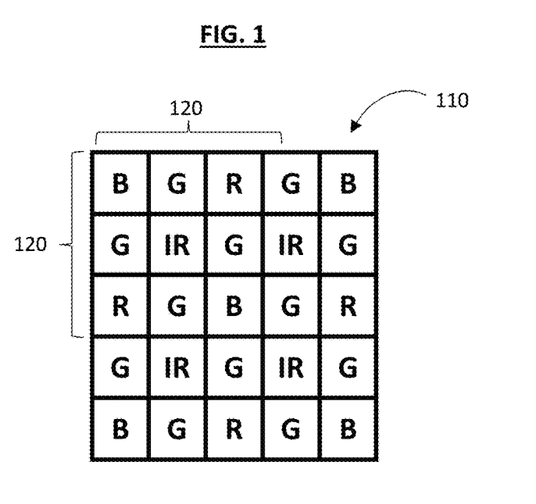
FIG. 1 shows a portion of a pixel array from an RGB-IR image sensor, according to an example.
Figure 2:
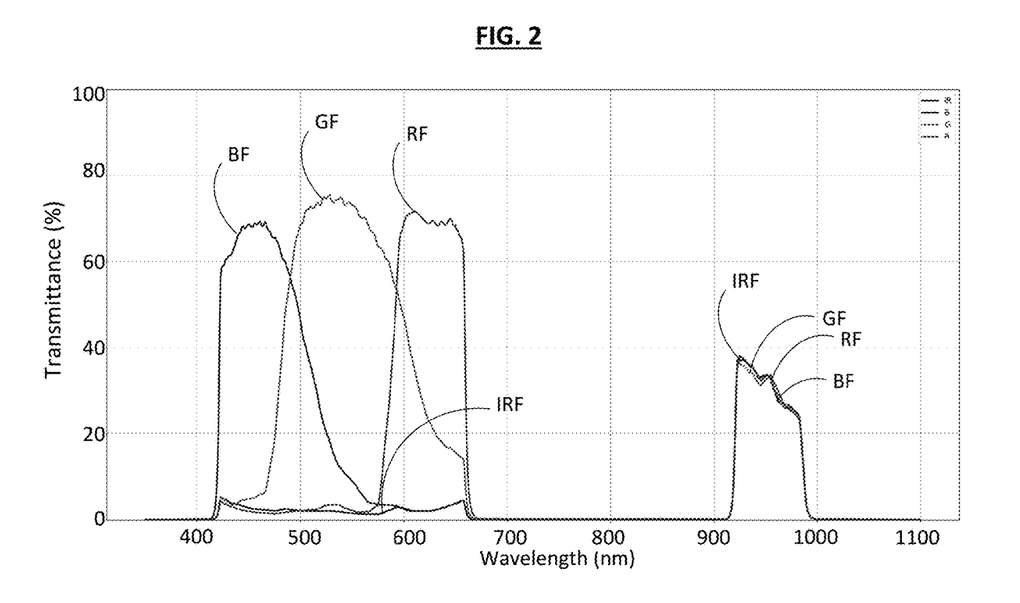
FIG. 2 represents characteristic curves of spectral filter transmittance of the RGB-IR image sensor of FIG. 1, according to an example.

RGB-IR sensors provide a significant advantage as it allows to capture both day and night images with the same sensor. An RGB-IR image sensor works in both ranges: visual spectrum range and IR spectrum range. By committing typically 25% of its pixel array pattern to infrared (IR) and 75% to RGB, the RGB-IR sensor can simultaneously capture both RGB and IR images. FIG. 1 represents an example of a small part of a pixel array, including 5×5 pixels, extracted from an RGB-IR sensor pixel array that may include several thousands of pixels. The configuration of the IR and RGB pixels is based on a pixel array pattern of 4×4 pixels that is repeated in rows and columns to form the whole pixel array. The RGB-IR image sensor does not have any dedicated filter to improve the quality of the signal: it measures everything and extracts both images IR and RGB. This causes some optical issues because the signals in both IR and RGB domains are contaminated. All the pixels in the pixel array of the RGB-IR sensor are receptive to IR signal. It means that not only the IR pixels are receptive to the IR signal but also the RGB pixels. Furthermore, the IR pixels also receive a small amount of visible light signal. FIG. 2 represents the filter transmittance per wavelength of each type of pixel from a known RGB-IR image sensor. It includes four curves that respectively represent the spectral filter transmittance characteristics related to filters of red, green, blue and IR pixels. These curves may be provided by the sensor manufacturer.

Consider the curve corresponding a red pixel. It defines, under the curve, a main area within the red spectrum range and a smaller area within the IR spectrum range. This is the same for each of the blue pixel curve and green pixel curve. The curve of an IR pixel defines a main area in the IR spectrum range and a small area in the RGB spectrum range, at the bottom of the blue, green, and red pixels areas. As illustrated in FIG. 2, each pixel of the RGB-IR image sensor measures a mixture of IR signal and RGB signal. It means that the intensity value at the output of each pixel includes a part that comes for a received IR signal and a part that comes from a received RGB signal.

In automotive industry, infrared signals play a key role in automated image processing applications like surveillance and driver monitoring. Usually, these applications require pure infrared images, and they cannot work on raw RGB-IR inputs. Therefore, infrared signal may need to be extracted before further processing could be performed.

A known solution to extract infrared image data from the output data of an RGB-IR sensor is to keep only the IR pixels and discard red, green, and blue pixels. Such an approach is the easiest and most straightforward approach. However, it results in losing three quarters of the original resolution of the image sensor in the infrared image. This is a significant drawback for driver monitoring applications that require high resolution images, for example for eye pupils tracking.

Another known solution for infrared image data extraction involves various kinds of image interpolation, such as nearest neighbor interpolation, linear interpolation, or spline-based interpolation, to reach original sensor resolution from a quarter one. Such an approach resolves the problem with the resulting infrared image resolution. However, it does not provide additional level of image details as it uses the same quarter resolution input as the previous approach.

Therefore, there is a need for improving the situation. More precisely, there is a need for separating the two images, RGB and IR, from the data at the output of the RGB-IR sensor without losing quality, in particular in the infrared image.

SUMMARY

The present disclosure relates to the field of imaging systems for generating infrared (IR) images. Such imaging systems can be used for example in a vehicle to provide surveillance and driver condition monitoring. In one example, a method of generating an infrared image is described. The method includes a step of processing pixel values provided at the output of an image sensor comprising a two-dimensional array of pixels including a mix of IR pixels and color pixels. The step of processing includes, for each color pixel, determining a local color-related ratio indicative of a part of infrared light reception in the color pixel, and estimating an infrared portion value from a color pixel value based on the local color-related ratio. The method further includes generating an infrared image from pixel values from the IR pixels and the estimated infrared portion values from the color pixels.

In some cases, the method enables an infrared image extraction from a multi-spectral image captured by the image sensor including a mix of color pixels and IR pixels, for example an RGB-IR sensor. The extraction uses all pixels, including not only the IR pixels but also the color pixels, which allows to preserve the original level of details in the infrared image. The resolution of the infrared image is the same as the resolution of the original image at the output of the image sensor.

In an embodiment, the step of determining the local color-related ratio for a color pixel may include deriving said local color-related ratio from the pixel values of at least one IR pixel positioned adjacent to said color pixel in the array of pixels.

In an embodiment, the step of determining the local color-related ratio for said color pixel may include deriving said local color-related ratio from the pixel values of one or more color pixels having the same color as said color pixel, which are positioned adjacent to said at least one IR pixel in the array of pixels.

Consider a target color pixel within the pixel array. For said target color pixel, a local color-related ratio, of the same color as said color pixel, indicative of the part of infrared reception in the color pixel is determined based on the neighborhood of said target color pixel, for example based on the IR pixel(s) adjacent to said target color pixel and the "double adjacent" color pixel(s) of the same color, i.e. the color pixels that are adjacent to the adjacent IR pixel. IR pixels adjacent to the target color pixel may be used to estimate of a local infrared reception, while the "double adjacent" color pixels that are adjacent to each adjacent IR pixel may be used to estimate a local mixed color and infrared reception. The local color-related ratio may be estimated based on a ratio between the local infrared reception and the local mixed color and infrared reception.

In an embodiment, the step of determining said local color-related ratio for said color pixel includes determining a plurality of color-related ratios respectively related to a plurality of IR pixels positioned adjacent to said color pixel in the array of pixels, and averaging said plurality of color-related ratios.

Averaging the color-related ratios determined for a plurality of IR pixels positioned adjacent to the target color pixel, for example for all IR pixels adjacent to the target color pixel, allows to refine the value of the local color-related ratio, in particular in case that there is an edge, for example an edge of an object sensed by the image sensor, in the middle of the color pixel. In such a case, the color-related ratios determined for several adjacent pixels may be quite different. To preserve the edge, the color-related ratios within the neighbor area of the color pixels are averaged.

In an embodiment, the step of estimating an infrared portion value for each color pixel may include applying the determined local the color-related ratio to a pixel value from said color pixel.

In an embodiment, the method may further comprise, prior to the step of processing, a first preprocessing step including adjusting an infrared transmittance of the color pixels in the array of pixels to a target level.

In an embodiment, the step of adjusting the infrared transmittance of the color pixels to the target level includes applying color-related normalization factors to the color pixel values.

The first preprocessing step allows to even out the IR transmittance or sensitivity of all pixels, so that color pixels and IR pixels have the same target level of IR transmittance. This preprocessing step is mostly technically connected to the sensor production technology. Each of the pixels may have different filters, for example red, green, blue and IR filters in case of an RGB-IR sensor, which magnify the received signal differently. Each pixel has a different magnitude of intensity amplification in the IR spectrum. If the source of light is sunlight, the amplitudes sensed by red, green, blue and IR pixels in the IR spectrum may be different. The first preprocessing step allows to normalize the intensity level regarding the IR spectrum such that the power at each pixel is balanced. The first pre-processing step allows to even out the imbalance between color and IR pixels with regards to the IR transmittance or sensitivity.

In case of an RGB-IR sensor, a red normalization factor, a green normalization factor and a red normalization factor may be predetermined and respectively applied to the subset of red pixels, to the subset of green pixels, to the subset of blue pixels. For IR pixels, advantageously, no normalization factor should be applied because pixel values from the color pixels are normalized to the level of IR reception level of the IR pixels.

In an embodiment, the color-related normalization factors are determined by illuminating with an only infrared light signal a target that is monotonically reflective in the light spectrum from visible spectrum to infrared spectrum, receiving by the image sensor the infrared light signal reflected by said target, and averaging all IR pixel values to determine a mean IR value. The normalization factors are further determined by, for each color channel, averaging all color pixel values to determine a mean color value, and calculating each color-related normalization factor by calculating the ratio between the mean IR value and the mean color value.

Alternatively, the color-related normalization factors may be calculated from spectral transmittance characteristics of the image sensor.

In an embodiment, the method may further include a second preprocessing step performed after the first preprocessing step. The second preprocessing step includes, for each IR pixel, determining color portion values, representative of the part of color light reception in the IR pixel, in all color channels, from the pixel value of said IR pixel and predetermined color-related IR contamination gain coefficients, and filtering the pixel value of said IR pixel by removing the determined color portion values.

The method may comprise the second preprocessing step enabling to filter or purify the output from the IR pixels, which may be contaminated with visible light. Indeed, the light having all spectral range may not be filtered properly. For example, consider a light source emitting light in IR spectrum as well as in visible spectrum, the IR pixels may not completely cut out the visible spectrum, and still receive some signal from the visible spectrum. As a result, each IR pixel may sense a small amount of visible light, for example something like roughly 15-20% of the intensity received in the visible spectrum.

The second preprocessing step aims to compensate this phenomenon, by estimating and eliminating the contamination of the IR pixel response by the visible light spectrum. For that purpose, the area under the IR filter curve in the visible spectrum shown in FIG. 2 may be evaluated to determine the portion of this area in the response of the IR pixel. The pixel value at the output of each IR pixel is the sum of a value in IR spectrum and a value in visible light spectrum. The purpose of the above preprocessing step is to eliminate the value in RGB spectrum.

In an embodiment, the step of determining the color portion values for each IR pixel includes, for each color channel, determining a local color pixel value from at least one color pixel of said color channel positioned adjacent to said IR pixel, filtering said local color pixel value by removing an infrared light reception part value that is estimated as equal to the pixel value of said IR pixel, and determining said color portion value of the IR pixel by applying a predetermined color-related IR contamination gain coefficient to said filtered local color pixel value.

The step of determining, for each color channel, a local color pixel value may include averaging the color pixel values of a plurality of color pixels positioned adjacent to said IR pixel.

In an embodiment, the method may further comprise a step of weighting said color portion values of each IR pixel by respective color-related intensity weights depending on detected light conditions in an environment of the image sensor.

The intensity weights may be dependent on light conditions in an environment surrounding the image sensor. The color portion value for each color channel may be weighted by the corresponding color-related intensity weight.

In an embodiment, the color-related IR contamination gain coefficient for each color channel may be determined by illuminating a target that is monotonically reflective in the light spectrum from visible spectrum to infrared spectrum, with a monochromatic light signal of said color, receiving by the image sensor the monochromatic light signal reflected by said target, and averaging all IR pixel values to determine a first mean color value. The gain coefficient may be determined further by averaging all color pixel values related to said color to determine a second mean color value. The color-related IR contamination gain coefficient can be calculated by calculating the ratio between the first mean color value and the second mean color value.

Alternatively, the color-related IR contamination gain coefficients are calculated from spectral transmittance characteristics of the image sensor.

The present disclosure also concerns an imaging system comprising: an image sensor comprising a two-dimensional array of pixels including color pixels and IR pixels, and an image processor for processing pixel values provided at the output of said pixels, configured to carry out the steps of the methods defined herein.

Each color pixel may operate in one color channel, for example red or green or blue. The array of pixels may include color pixels for a plurality of color channels, for example red pixels, green pixels, and blue pixels.

The present disclosure also concerns a computer program comprising instructions which, when the program is executed by a computer, cause the computer to carry out the steps of the methods defined herein.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 6:
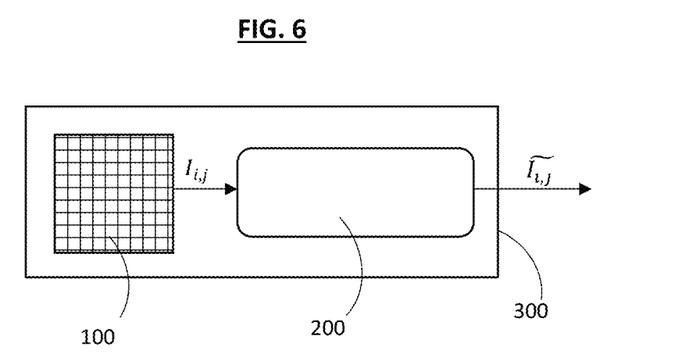
FIG. 6 represents a functional block diagram of an imaging system including an RGB-IR sensor, according to an embodiment.

The present disclosure concerns an imaging system 300. The imaging system 300 includes an RGB-IR image sensor 100 including a two-dimensional array of pixels 110 having color pixels and IR pixels, and an image processor 200 for processing pixel values provided at the output of said pixels.

In the present disclosure, the term "pixel" represents a photo-sensing element that may include a pixel photosensor and a tiny filter placed over the pixel photosensor to filter the light by wavelength range. The color pixels include respective color filters that are placed over the pixel photosensors to capture color information, while the IR pixels include respective IR filters that are placed over the pixel photosensors to capture infrared information. The color filters and the IR filters form a mosaic or two-dimensional array of filters.

By definition, in the present disclosure, a first pixel is positioned "adjacent" to a second pixel in the array of pixels 110 if said the first and second pixels have one side or one corner in common.

An example of an RGB-IR color filter array (CFA) is illustrated in FIG. 1. In the structure of the RGB-IR color filter array 110 in FIG. 1, each 4×4 cell or pixel unit has two red (R), four green (G), two blue (B) and four infrared (IR) pixels. Each 4×4 cell unit is repeated in the two dimensions of the array to form the two-dimensional array of pixels 110 of the RGB-IR sensor 100.

Any other configuration of the filter array, different from the one illustrated in FIG. 1, is possible.

FIG. 2 represents curves of filter transmittance per wavelength for color filters, namely a red filter RF, a green filter GF and a blue filter BF, and the infrared filter IRF, according to an illustrative example. The color-related filter transmittance curves of FIG. 2 show that the color pixels, here the red R, green G, and blue B pixels, are sensitive in the infrared wavelength range, the IR pixels are weakly sensitive in the visible light wavelength range.

The image processor 200 is configured to process the pixel values $I_{i,j}$ at the output of the color and IR pixels (i,j) to generate images, such as color images and IR images, "i" and "j" respectively representing indexes of column and row in the array of pixels 110.

In the present disclosure, the image processor 200 is configured to carry out a method of generating an infrared (IR) image comprising a step of processing the pixel values $I_{i,j}$ of the color and IR pixels (i,j) provided at the output of the RGB-IR sensor 100, with reference to FIG. 5. The step of processing includes the steps S3 to S5 described below.

The present methods defined herein enables generation of an infrared image from all the pixels (i,j), including not only the IR pixels, with $(i,j) \in S_{IR}$, but also the color pixels with $(i,j) \in S_R \cup S_G \cup S_B$, where $S_{IR}$, $S_R$, $S_G$, $S_B$ respectively represent the sets of IR, red, green, and blue pixels.

In the step of processing, for each color pixel (i,j), with $(i,j) \in S_R \cup S_G \cup S_B$, within the array of pixels 110, the image processor 200 determines a local color-related rat-o—noted $\overline{\rho R_{i,j}}$ for a red pixel (i,j), $\overline{\rho G_{i,j}}$, for a green pixel (i,j), $\overline{\rho B_{i,j}}$, for a blue pixel (i,j–)—indicative of the part of infrared light reception in the color pixel (i,j) in a step S3, and, in a step S4, estimates an infrared portion value from or of a pixel value of the color pixel (i,j), based on this local color-related ratio $\overline{\rho R_{i,j}}$, $\overline{\rho G_{i,j}}$, or $\overline{\rho B_{i,j}}$. In an embodiment, in the step S4, the local color-related ratio $\overline{\rho R_{i,j}}$, $\overline{\rho G_{i,j}}$, or $\overline{\rho B_{i,j}}$ may be applied to a pixel value of the color pixel (i,j), to estimate the infrared portion value of the color pixel (i,j). For example, the color pixel value may be multiplied by the local color-related ratio $\overline{\rho R_{i,j}}$, $\overline{\rho G_{i,j}}$ or $\overline{\rho B_{i,j}}$. The values at the output of the step S4 are noted $\widetilde{I_{i,j}}$, which correspond to the infrared portion values for the color pixels and the pixels values for the IR pixels, optionally preprocessed as explained below. Then, in a step S5, the image processor 200 generates the infrared image from pixel values from the IR pixels and from the estimated infrared portion values of the color pixels, as explained later in more detail.

Figure 5A:
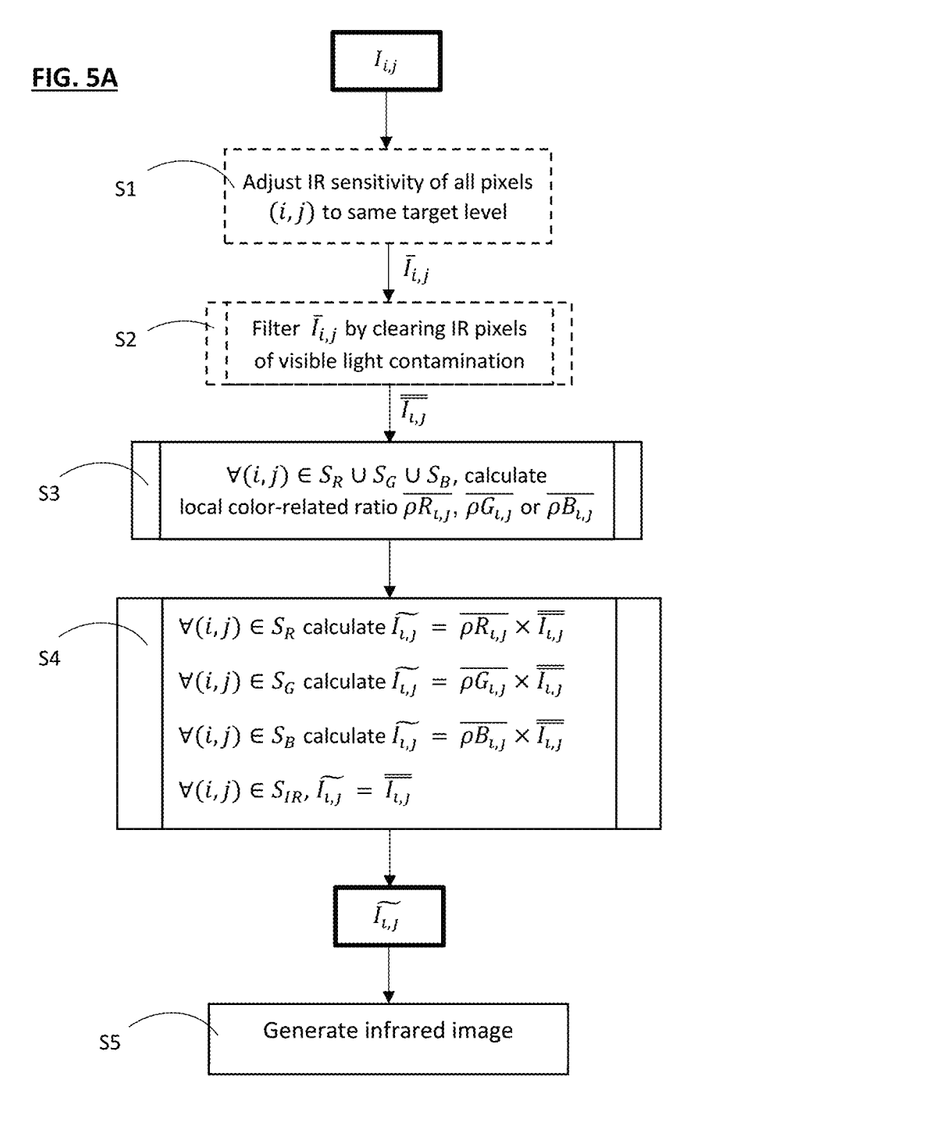
FIGS. 5A to 5F are flowcharts related to a method of generating an infrared image by processing pixel values provided at the output of an RGB-IR image sensor, according to an embodiment.
Figure 5B:
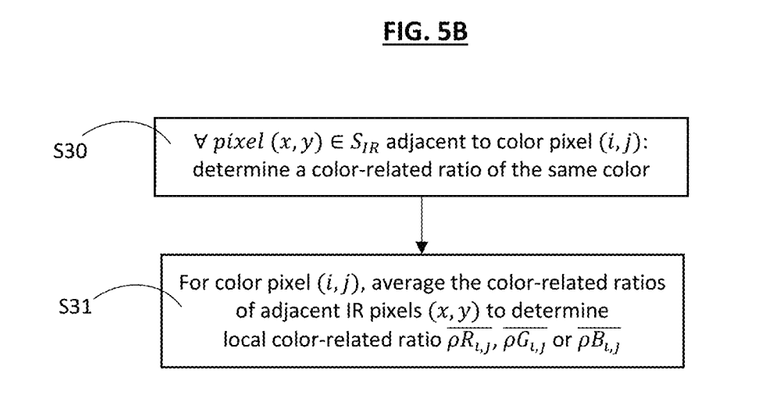

In an embodiment, in the step S3, for each color pixel (i, j) with (i, j)∈$S_R$, or (i, j)∈$S_G$, or (i,j)∈$S_B$, within the array of pixels 110, the local color-related ratio $\overline{\rho R_{i,j}}$, $\overline{\rho G_{i,j}}$ or $\overline{\rho B_{i,j}}$ may be derived from pixel values of at least one IR pixel, noted (x,y), positioned adjacent to said color pixel (i,j) in the array of pixels 110 and of one or more color pixels having the same color as said color pixel, that are positioned adjacent to said at least one adjacent IR pixel (x, y) in the array of pixels 100. For example, as illustrated in FIG. 5B, in the step S3, for each color pixel (i,j), the image processor 200 may in a step S30, determine a plurality of color-related ratios respectively related to a plurality of IR pixels (x, y) positioned adjacent to said color pixel (i,j) in the array of pixels 110. The color-related ratio related to each IR pixel is derived from the pixel values of said IR pixel (x,y) and of one or more color pixels having the same color as said color pixel (i,j), that are positioned adjacent to said IR pixel (x,y) in the array of pixels 110. In a step S31, calculate an average of the plurality of determined color-related ratios to determine the local color-related ratio $\overline{\rho R_{i,j}}$, $\overline{\rho G_{i,j}}$ or $\overline{\rho B_{i,j}}$.

Preferably, to determine to color-related ratio for a given color pixel (i,j), the step S30 may be performed for each IR pixel (x, y) positioned adjacent to said color pixel (i,j) and/or for each color pixel of the same color as the color pixel (i,j), that are positioned adjacent to each adjacent IR pixel (x, y). Thus, in an embodiment, the color-related ratio $\rho R_{i,j}$, $\rho G_{i,j}$ or $\rho B_{i,j}$ of the color pixel (i,j) may be an average of the color-related ratios of all the IR pixels (x, y) positioned adjacent to said color pixel (i,j). Furthermore, the color related ratio of each adjacent IR pixel (x,y) may be estimated from pixels values from said adjacent IR pixel (x, y) and all color pixels of the same color as the color pixel (i,j) that are positioned adjacent to said adjacent IR pixel (x, y).

The steps S3 to S5 of the processing step will be described in more detail later, based on an illustrative example.

In some embodiments, the methods defined herein may include one or more pre-processing steps performed by the image processor 200 before the processing step, in other words before the steps S3, S4 and S5. The preprocessing steps may be optional.

In an embodiment, a first preprocessing step S1 has the function of adjusting infrared transmittance or sensitivity of the color pixels (i,j) in the array of pixels 110 to a same target level. This target level may be defined based on the IR transmittance or sensitivity of the IR pixels. In the preprocessing step S1, the amplitudes, or levels, of infrared light reception of colors pixels may be evened out with the amplitude, or level, of infrared light reception of the IR pixels.

For example, for each color channel R, G, B, a color-related normalization factor, noted ngainR for red color, ngainG for green color, and ngainB for blue color, is applied to the pixel values at the output of the color pixels (i,j). Thus, for each color channel R, G, B, the pixel values at the output of the color pixels (i,j) are multiplied by a color-related normalization factor, ngainR, ngainG, or ngainB, configured to adjust the IR transmittance or sensitivity of said color pixels (i,j) to the target level of IR sensitivity of the IR pixels. As a result, the pixel values provided by the image sensor 200 at the output of the first preprocessing step S1 may be modified, or normalized, for the color pixels. The pixel values of the pixels at the output of the first preprocessing step S1, noted $\overline{I}_{i,j}$ for each color or IR pixel (i,j), can be expressed as follows:

$$\overline{I}_{i,j} = \begin{cases} I_{i,j} * ngainR, & \text{for } (i, j) \in S_R \\ I_{i,j} * ngainG, & \text{for } (i, j) \in S_G \\ I_{i,j} * ngainB, & \text{for } (i, j) \in S_B \\ I_{i,j}, & \text{for } (i, j) \in S_{IR} \end{cases},$$

where $I_{i,j}$ are the original pixel value, here unprocessed, at the output of the pixel (i,j), and ngainR, ngainG, and ngainB are the color-related normalization factors for the red color, green color, and blue color, respectively.

The color-related normalization factors ngainR, ngainG, and ngainB may be determined in a preliminary step PS1.

Figure 5C:
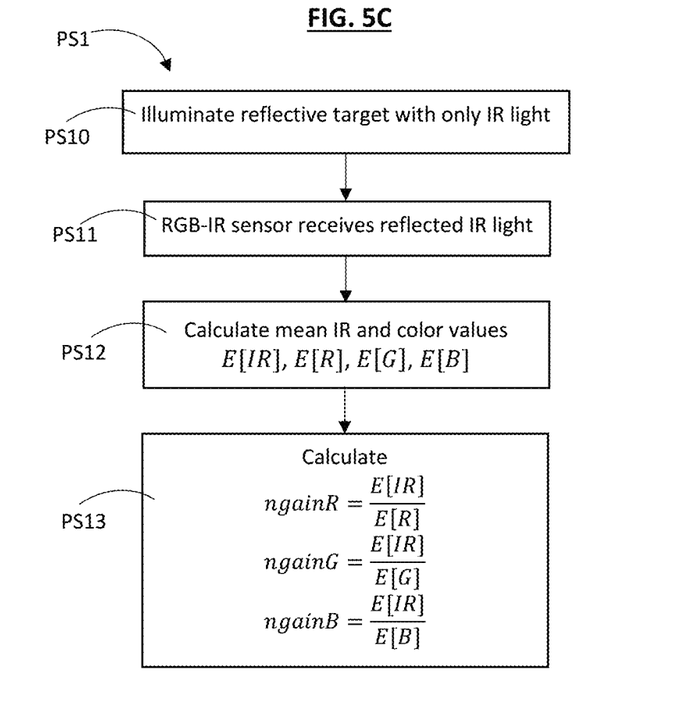

In a first variant of the preliminary step PS1, illustrated in FIG. 5C, a reflective target that is monotonically reflective in the light spectrum from visible spectrum to infrared spectrum, such as a white target, may be illuminated with only infrared light or signal, and the RGB-IR sensor may receive the IR light reflected by the reflective target. Then, it is determined how the color pixels react to this IR light. A goal of the preliminary step PS1 is to even out the intensity of the IR light as detected by all color and IR pixels. For that purpose, for each color channel R, G and B, a color-related normalization factor ngainR, ngainG, and ngainB is determined from the values at the output of the color and IR pixels, as explained below in more detail.

The preliminary step PS1 may be performed, for example by a manufacturer of the RGB-IR sensor 100, on the RGB-IR sensor 100 or on a reference RGB-IR sensor having the same characteristics as the RGB-IR sensor 100, in particular the same curves of filter transmittance per wavelength.

In the first variant, the preliminary step PS1 may include a step PS10 of illuminating with an only infrared light signal the target monotonically reflective from visible spectrum to infrared spectrum.

In a step PS11, the RGB-IR sensor 100 may receive the infrared signal reflected by said target and then output pixel values from color pixels and IR pixels.

Then, in a step PS12, the image processor 200 may calculate an average of the pixel values at the output of all IR pixels to calculate a mean IR value E[IR]. The image processor 300 may, for each color channel, calculate an average of the pixel values at the output of all the color pixels to calculate a mean color value, noted E[R] for the red channel, E[G] for the green channel and E[B] for the blue channel.

In a next step PS13, the image processor 200 may calculate, for each color channel, the ratio between the mean IR value E[IR] and the mean color value namely E[R] for the red channel, E[G] for the green channel and E[B] for the blue channel, to determine the color-related normalization factor. The color related-normalization factors may be expressed as follows:

$$ngainR = \frac{E[IR]}{E[R]},$$

$$ngainG = \frac{E[IR]}{E[G]},$$

$$ngainB = \frac{E[IR]}{E[B]},$$

where ngainR,ngainG,ngainB are the red-related, green-related, and blue-related normalization factors, E[IR] is the mean IR value derived from all IR pixels when the RGB-IR sensor receives the only infrared light signal reflected by the reflective target, and E[R] is the mean red value derived from all red pixels when the RGB-IR sensor receives the only infrared light signal reflected by the reflective target. E[G] is the mean green value derived from all green pixels when the RGB-IR sensor receives the only infrared light signal reflected by the reflective target, and E[B] is the mean blue value derived from all blue pixels when the RGB-IR sensor receives the only infrared light signal reflected by the reflective target.

In a second variant, the color-related normalization factors ngainR, ngainG, ngainB may be calculated from spectral transmittance characteristics of the RGB-IR sensor. For example, for each color channel R, G, B, a peak value of the IR curve of filter transmittance within the infrared wavelength range is divided by a peak value of the color curve of filter transmittance within the infrared wavelength range to obtain the color-related normalization factor ngainR, ngainG, ngainB.

In an embodiment, the methods defined herein may include a second pre-processing step S2, performed by the image processor 200, having the function of eliminating from the IR pixel response the contamination in the visible light spectrum. In other words, the step S2 aims to filter, or purify, the pixel values of the IR pixels (i,j) by removing a portion value due to the contamination by visible light.

Advantageously, the second preprocessing step S2 may be performed after the first preprocessing step S1, so that the pixel values $\bar{I}_{i,j}$ provided at the output of the first preprocessing step S1 are taken as input values in the second preprocessing step S2. It means that all the pixel values used as input values in the second preprocessing step S2 have the same target level of IR reception, in other words the same infrared sensitivity.

Figure 3:
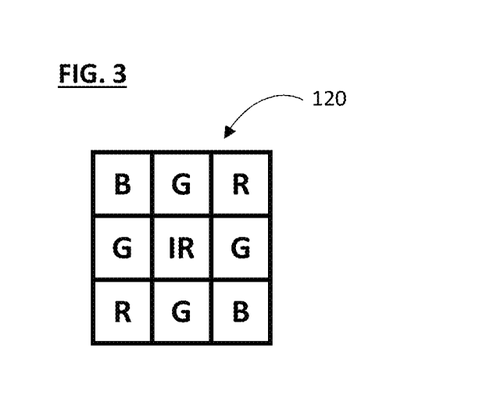
FIG. 3 represents a 3×3 pixel sub-array from FIG. 1.

Consider the IR pixel (i,j) shown in FIG. 3 to illustrate the second preprocessing step S2.

Figure 5D:
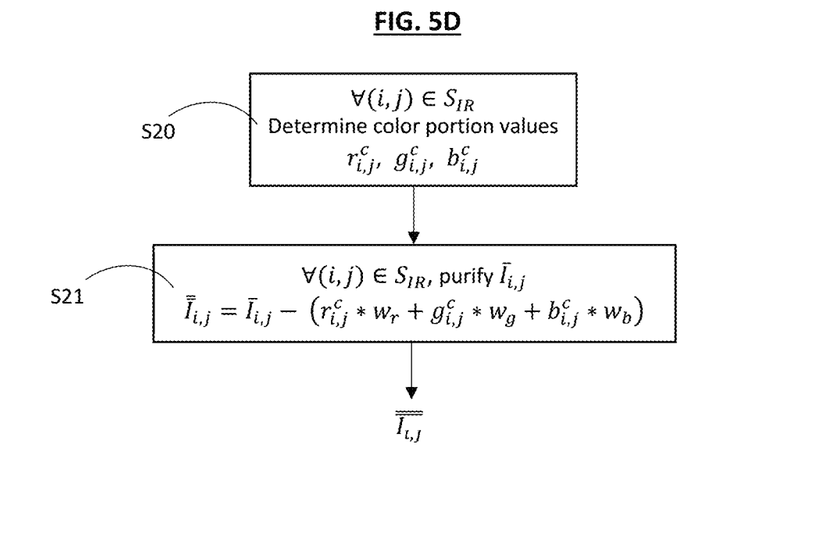
Figure 5E:
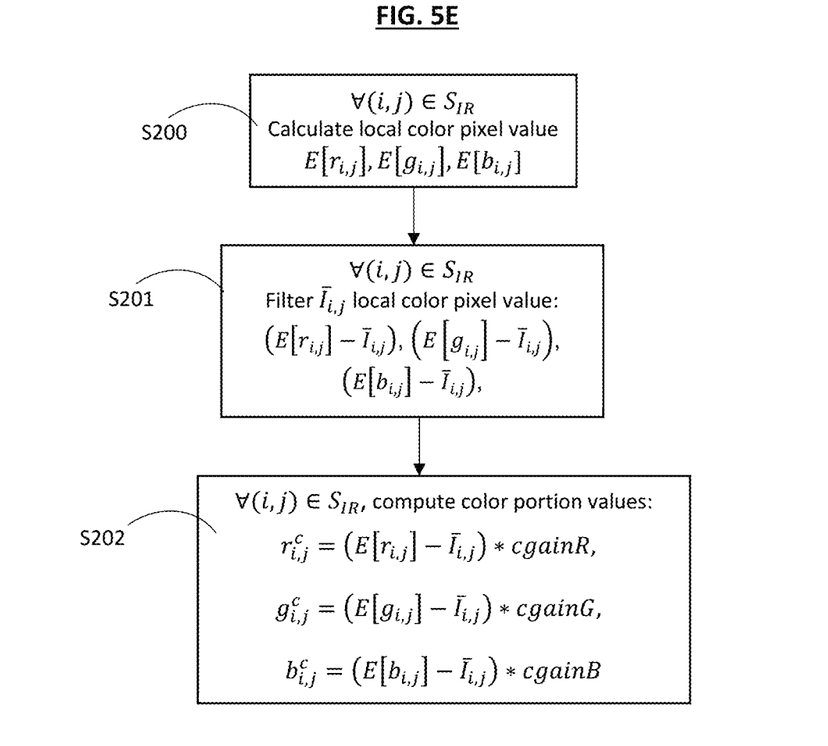
Figure 5F:
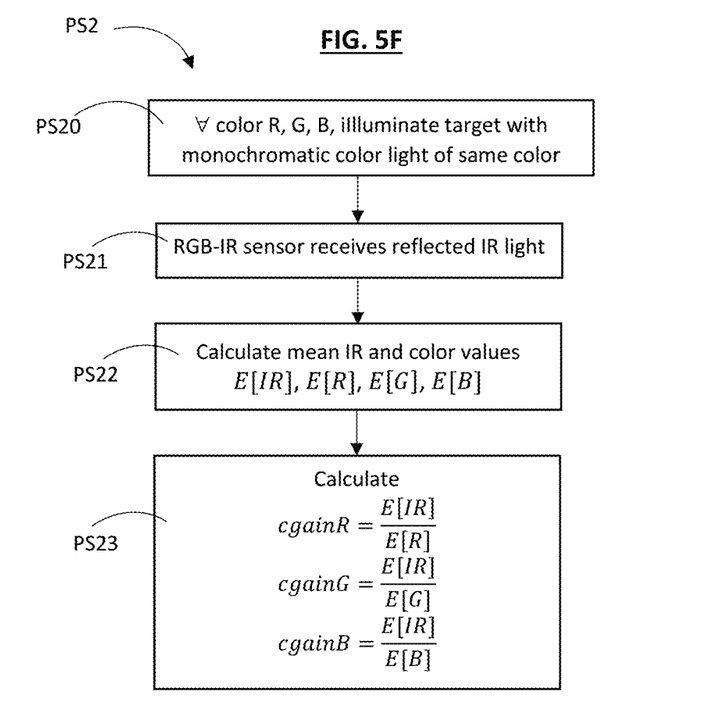

The second preprocessing step S2, illustrated in FIG. 5D, comprises, for each IR pixel (i, j), with (i,j)∈$S_{IR}$: a first step S20 of determining color portion values, noted $r_{i,j}^c$, $g_{i,j}^c$, $b_{i,j}^c$, representative of the part of color light reception or contamination in the IR pixel (i,j), for all color channels R, G, B, from the pixel value of said IR pixel (i,j) and predetermined color-related IR contamination gain coefficients cgainR, cgainG, and cgainB. The second preprocessing step S2 further includes a second step S21 of filtering the pixel value $\bar{I}_{i,j}$ of said IR pixel (i,j) with (i,j)∈$S_{IR}$, by removing the respective color portion values $r_{i,j}^c$, $g_{i,j}^c$, $b_{i,j}^c$ of all color channels R, G, B, determined in the step S20.

The first step S20 of determining the color portion values $r_{i,j}^c$, $g_{i,j}^c$, $b_{i,j}^c$ for each IR pixel (i,j) with (i,j)∈$S_{IR}$ may include, for each color channel R, G, B, a step S200 of determining a local color pixel value, noted $E[r_{i,j}]$ for red color, $E[g_{i,j}]$ for green color, and $E[b_{i,j}]$ for blue color, from one or more color pixels that are positioned adjacent to said IR pixel (i,j). The first step S20 may further include a step S201 of filtering the determined local color pixel value $E[r_{i,j}]$, $E[g_{i,j}]$ and $E[b_{i,j}]$ by removing an infrared light reception part value that is estimated as equal to the pixel value $\bar{I}_{i,j}$ of said IR pixel (i,j). The first step S20 can also include a step S202 of determining said color portion value $r_{i,j}^c$, $g_{i,j}^c$, $b_{i,j}^c$ of the IR pixel (i,j) with (i,j)∈$S_{IR}$ by applying the predetermined color-related IR contamination gain coefficient cgainR, cgainG, cgainB to said filtered local color pixel value, namely $(E[r_{i,j}]-\bar{I}_{i,j})$, $(E[g_{i,j}]-\bar{I}_{i,j})$ and $(E[b_{i,j}]-\bar{I}_{i,j})$, cleared of the part of IR reception.

In the step S200, for each color channel R, G, B, the local color pixel value, namely $E[r_{i,j}]$ for red color, $E[g_{i,j}]$ for green color, and $E[b_{i,j}]$ for blue color, may be computed by calculating an average of the color pixel values from the color pixels positioned adjacent to said IR pixel (i,j). For example, for each color channel R, G, B, the one or more adjacent color pixels may include all the color pixels of said color channel positioned adjacent to said IR pixel (i, j).

Consider the IR pixel (i, j) shown in FIG. 3. A local green pixel value $E[g_{i,j}]$ can be computed by calculating an average of the pixel values from the four green pixels positioned adjacent to the IR pixel (i,j). A local red pixel value $E[r_{i,j}]$ can be computed by calculating an average of the pixel values from the two red pixels positioned adjacent to the IR pixel (i,j). A local blue pixel value $E[b_{i,j}]$ can be computed by calculating an average of the pixel values from the two blue pixels positioned adjacent to the IR pixel (i,j).

In the step S201, for each color channel R, G, B, the pixel value $\bar{I}_{i,j}$ of the IR pixel (i,j) is subtracted from the local color pixel value, namely $E[r_{i,j}]$ for red color, $E[g_{i,j}]$ for green color, and $E[b_{i,j}]$ for blue color, to filter, or purify, it.

In the step S202, for each color channel, the color portion value $r_{i,j}^c$, $g_{i,j}^c$, $b_{i,j}^c$ is extracted or derived from the filtered local color pixel value resulting from the step S201. In an embodiment, said the filtered local color pixel value is multiplied by color-related IR contamination gain coefficient cgainR, cgainG, and cgainB, to obtain the color portion value $r_{i,j}^c$, $g_{i,j}^c$, $b_{i,j}^c$.

The color portion values $r_{i,j}^c$, $g_{i,j}^c$, $b_{i,j}^c$ representative of the part of color light reception in the IR pixel (i,j) with (i,j)∈$S_{IR}$ can be expressed as follows for all color channels R, G, B, respectively:

$$r_{i,j}^c = (E[r_{i,j}] - \bar{I}_{i,j}) * cgainR, \text{ for } (i,j) \in S_{IR},$$

$$g_{i,j}^c = (E[g_{i,j}] - \bar{I}_{i,j}) * cgainG, \text{ for } (i,j) \in S_{IR},$$

$$b_{i,j}^c = (E[b_{i,j}] - \bar{I}_{i,j}) * cgainB, \text{ for } (i,j) \in S_{IR},$$

where $r_{i,j}^c$, $g_{i,j}^c$, $b_{i,j}^c$ represent the red, green, and blue portion values for the IR pixel (i,j), $E[r_{i,j}]$, $E[g_{i,j}]$, and $E[b_{i,j}]$ represent the local red, green, and blue pixel value for the IR pixel (i,j), $\bar{I}_{i,j}$ represents the pixel value of the IR pixel (i,j) after the first preprocessing step S1, and cgainR, cgainG, and cgainB represent the red-related, green-related, and blue-related IR contamination gain coefficients.

In the second step S21 of filtering the pixel value $\bar{I}_{i,j}$ of the IR pixel (i,j), the respective color portion values $r_{i,j}^c$, $g_{i,j}^c$, $b_{i,j}^c$ for all color channels R, G, B are subtracted from the pixel value i,j of the IR pixel (i,j).

In a particular embodiment, in the second step S21, the color portion values $r_{i,j}^c$, $g_{i,j}^c$, $b_{i,j}^c$ may be weighted, by respective color-related intensity weights, noted $w_r$, $w_g$, $w_b$, comprised between 0 and 1, in the subtraction. These intensity weights $r_{i,j}^c$, $g_{i,j}^c$, $b_{i,j}^c$ may depend on detected light conditions in an environment of the RGB-IR sensor 100. As an illustrative and non-limitative example, the following intensity weights could be used in sunlight condition: $w_r=0.3$, $w_g=0.4$, $w_b=0.3$. The filtered pixel values $\tilde{I}_{i,j}$ of the IR pixel (i,j), cleared of the part of visible light reception, can be expressed as follows:

$$\tilde{I}_{i,j} = \bar{I}_{i,j} - (r_{i,j}^c * w_r + g_{i,j}^c * w_g + b_{i,j}^c * w_b), \text{ for } (i,j) \in S_{IR},$$

where $\tilde{I}_{i,j}$ represents the pixel value of the IR pixel (i,j) without contamination in the visible light spectrum, $\bar{I}_{i,j}$ represents the pixel value of the IR pixel (i,j) after the first preprocessing step S1, and $r_{i,j}^c$, $g_{i,j}^c$, $b_{i,j}^c$ represent the red, green, and blue portion values. The terms $w_r$, $w_g$, $w_b$ represent color-related intensity weights with $0 \leq w_r$, $w_g$, $w_b \leq 1$.

The color-related IR contamination gain coefficients cgainR, cgainG, and cgainB may be determined in a preliminary step PS2.

In a first variant of the preliminary step PS2, for each color channel R, G, B, a target that is monotonically reflective in the light spectrum from visible spectrum to infrared spectrum, such as a white target, may be illuminated with monochromatic color light signal within the wavelength range of said color channel, and the RGB-IR sensor may receive the color light reflected by the reflective target. Then, it is determined how the color pixels of said color channel and the IR pixels react to this color light. A goal of the preliminary step PS2 is to determine, for each color channel, a ratio between the color reception of IR pixels and the color reception of the color pixels. For that purpose, for each color channel R, G and B, the target ratio is determined from the values at the output of the color and IR pixels when the RGB-IR sensor receives the reflected color light, as explained below in more detail.

The step PS2 may be performed, for example by a manufacturer of the RGB-IR sensor 100, on the RGB-IR sensor 100 or on a reference RGB-IR sensor having the same characteristics as the RGB-IR sensor 100, in particular the same curves of filter transmittance per wavelength.

In the first variant, the preliminary step PS2 may include, for each color channel R, G, B, a step PS20 of illuminating the reflective target monotonically reflective from visible spectrum to infrared spectrum with a monochromatic color light signal within the wavelength range of said color channel.

In a step PS21, the RGB-IR sensor 100 may receive the color light signal reflected by said reflective target and then output pixel values from color pixels and IR pixels. Then, in a step PS22, the image processor 200 may calculate an average of the pixel values at the output of all IR pixels to calculate a mean IR value E[IR]. The image processor 300 may calculate an average of the pixel values at the output of all the color pixels of the same color as the color light signal to calculate a mean color value, noted E[R] for the red channel, E[G] for the green channel and E[B] for the blue channel.

In a next step PS23, the image processor 200 may calculate the ratio between the mean IR value E[IR] and the mean color value namely E[R] for the red channel, or E[G] for the green channel, or E[B] for the blue channel, to determine the color-related IR contamination gain coefficient cgainR or cgainG or cgainB.

The color-related IR contamination gain coefficients may be expressed as follows:

$$cgainR = \frac{E[IR]}{E[R]},$$

$$cgainG = \frac{E[IR]}{E[G]},$$

$$cgainB = \frac{E[IR]}{E[B]},$$

where cgainR, cgainG, cgainB are the red-related, green-related, and blue-related IR contamination gain coefficients, E[IR] is the mean IR value derived from all IR pixels when the RGB-IR sensor receives the monochromatic color light of a given color R, G or B reflected by the reflective target, and E[R] is the mean red value derived from all red pixels when the RGB-IR sensor receives the monochromatic red light reflected by the reflective target. E[G] is the mean green value derived from all green pixels when the RGB-IR sensor receives the monochromatic green light reflected by the reflective target, and E[B] is the mean blue value derived from all blue pixels when the RGB-IR sensor receives the monochromatic blue light reflected by the reflective target.

In a second variant, the color-related IR contamination gain coefficients cgainR, cgainG, and cgainB may be calculated from spectral transmittance characteristics of the RGB-IR sensor. For example, for each color channel R, G, B, a peak or maximal value of the IR curve of filter transmittance within said color wavelength range is divided by a peak value of the color curve R, G or B of filter transmittance within said color wavelength range to obtain the color-related IR contamination gain coefficient cgainR, cgainG, cgainB.

The steps S3 to S5 will now be described in more detail, based on an illustrative example illustrated by FIG. 4.

In the present embodiment, the two preprocessing steps S1 and S2 are executed before the steps S3 to S5. Therefore, the pixel values used as inputs in the step S3 are the preprocessed pixel values at the output of the steps S1 and S2, noted $\bar{I}_{i,j}$ for each pixel (i,j). It means that the preprocessed pixels values $\bar{I}_{i,j}$ of the color pixels (i,j), with (i,j)∈ $S_R$, or (i,j)∈ $S_G$, or (i,j)∈ $S_B$, have been normalized by the color-related normalization factor ngainR, ngainG, or ngainB depending on the color of the pixel (i,j). This further means that the preprocessed pixel values IQ, of the IR pixels (i,j) with (i, j)∈ $S_{IR}$ have been filtered, cleared of the part of visible light reception.

Figure 4:
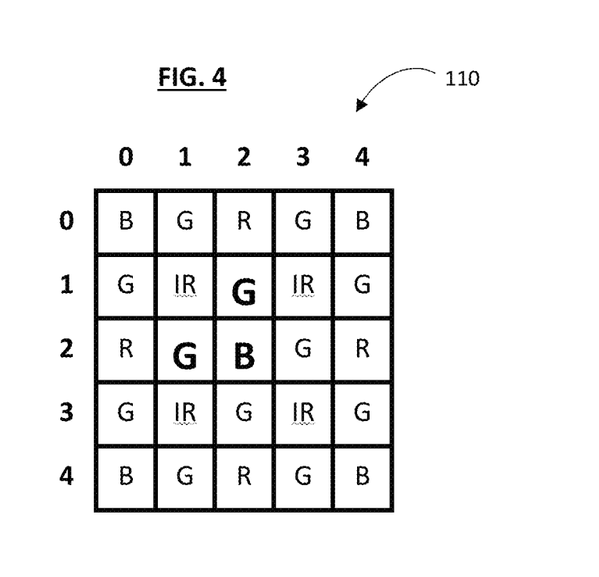
FIG. 4 shows the portion of pixel array of FIG. 1 wherein three color pixels have been marked.

FIG. 4 represents a subarray of 5×5 pixels from the array of pixels 110. In this subarray, the columns and rows can be numbered from index 0 to index 4. The process of estimating the infrared portion values of the color pixels (2,1), (1,2) and (2,2) will now be described.

Consider the green pixel (2,1). In the step S3, the image processor 200 determines the local green-related ratio indicative of the part of infrared light reception in the green pixel (2,1). For that purpose, in the step S30, the image processor 200 determines two green-related ratios respectively related to the two IR pixels (1,1) and (3,1) positioned adjacent to said green pixel (2,1). The green-related ratio related to each adjacent IR pixel (1,1)—or (3,1)—is derived from the pixel value of said adjacent IR pixel (1,1), or (3,1), and from the pixel values of the four "double-adjacent" green pixels (1,0), (0,1), (2,1) and (1,2)—or (3,0), (2,1), (3,2) and (4,1)—that are positioned adjacent to said adjacent IR pixel (1,1)—or (3,1). Each green-related ratio is a ratio between the filtered pixel value of the IR adjacent pixel and the normalized pixel values of the "double-adjacent" color pixels which response includes a mixed green and IR signal. The green-related ratio related to each adjacent IR pixel (x, y), here each of IR pixels (1,1) and (3,1), can be expressed as follows:

$$\rho G_{x,y} = \frac{4 \times \bar{I}_{x,y}}{\bar{I}_{x-1,y} + \bar{I}_{x+1,y} + \bar{I}_{x,y-1} + \bar{I}_{x,y+1}},$$

where $\rho G_{x,y}$ is the green-related ratio for the IR pixel (x,y), $\bar{I}_{x,y}$ is the preprocessed pixel value of the IR pixel (x, y), and $\bar{I}_{x-1,y}, \bar{I}_{x+1,y}, \bar{I}_{x,y-1}, \bar{I}_{x,y+1}$ are the preprocessed pixel values of the four green pixels (x−1, y), (x+1, y), (x, y−1), (x, y+1) positioned adjacent to said IR pixel (x, y).

Then, in the step S31, the image processor 200 calculates an average of the plurality of determined green-related ratios to determine the local green-related ratio $\overline{\rho G_{2,1}}$ for the green pixel (2,1) based on the following expression:

$$\overline{\rho G_{2,1}} = (\rho G_{1,1} + \rho G_{3,1}) \times 0.5$$

Then, in the step S4, the image processor 200 estimates the infrared portion value $\widetilde{I_{2,1}}$ for the green pixel (2,1), based on the above determined local green-related ratio $\rho G_{2,1}$, according to the following expression:

$$\widetilde{I_{2,1}} = \overline{I}_{2,1} \times \rho G_{2,1}.$$

Now, consider the green pixel (1,2). In the step S3, the image processor 200 determines the local green-related ratio indicative of the part of infrared light reception in the green pixel (1,2). For that purpose, in the step S30, the image processor 200 determines two green-related ratios respectively related to the two IR pixels (1,1) and (1,3) positioned adjacent to said green pixel (1,2). The green-related ratio related to each adjacent IR pixel (1,1)—or (1,3)—is derived from the pixel value of said adjacent IR pixel (1,1)—or (1,3)—and from the pixel values of the four "double-adjacent" green pixels (0,1), (1,0), (2,1) and (1,2)—or (0,3), (1,2), (2,3) and (1,4)—that are positioned adjacent to said adjacent IR pixel (1,1)—or (1,3). Each green-related ratio is a ratio between the filtered pixel value of the IR adjacent pixel and the normalized pixel values of the "double-adjacent" color pixels which response includes a mixed green and IR signal. The green-related ratio related to each adjacent IR pixel (x, y) can be expressed as follows:

$$\rho G_{x,y} = \frac{4 \times \overline{I}_{x,y}}{\overline{I}_{x-1,y} + \overline{I}_{x+1,y} + \overline{I}_{x,y-1} + \overline{I}_{x,y+1}},$$

where $\rho G_{x,y}$ is the green-related ratio for the IR pixel (x,y), $\overline{I}_{x,y}$ is the preprocessed pixel value of the IR pixel (x, y), and $\overline{I}_{x-1,y}, \overline{I}_{x+1,y}, \overline{I}_{x,y-1}, \overline{I}_{x,y+1}$ are the preprocessed pixel values of the four green pixels (x−1, y), (x+1, y), (x, y−1), (x, y+1) positioned adjacent to said IR pixel (x, y).

Then, in the step S31, the image processor 200 calculates an average of the plurality of determined green-related ratios to determine the local green-related ratio $\rho G_{1,2}$ for the green pixel (1,2) based on the following expression:

$$\overline{\rho G_{1,2}} = (\rho G_{1,1} + \rho G_{1,3}) \times 0.5.$$

Then, in the step S4, the image processor 200 estimates the infrared portion value $\widetilde{I_{1,2}}$ for the green pixel (1,2), based on the above determined local green-related ratio $\overline{\rho G_{1,2}}$, according to the following expression:

$$\widetilde{I_{1,2}} = \overline{I}_{1,2} \times \overline{\rho G_{1,2}}.$$

Now, consider the blue pixel (2,2). In the step S3, the image processor 200 determines the local blue-related ratio indicative of the part of infrared light reception in the blue pixel (1,2). For that purpose, in the step S30, the image processor 200 determines four blue-related ratios respectively related to the four IR pixels (1,1), (3,1), (1,3) and (3,3) positioned adjacent to said blue pixel (2,2). The blue-related ratio related to each adjacent IR pixel (1,1)—or (3,1) or (1,3) or (3,3)—is derived from the pixel value of said adjacent IR pixel (1,1)—or (3,1) or (1,3) or (3,3)—and from the pixel values of the two "double-adjacent" blue pixels (0,0), (2,2)—or (2,2), (4,0), or (2,2), (0,4), or (2,2), (4,4)—that are positioned adjacent to said adjacent IR pixel (1,1)—or (3,1) or (1,3) or (3,3). Each blue-related ratio is a ratio between the filtered pixel value of the IR adjacent pixel and the normalized pixel values of the "double-adjacent" color pixels which response includes a mixed blue and IR signal. The blue-related ratio related to each adjacent IR pixel (x, y)—here IR pixels (1,1), (3,1), (1,3), (3,3) can be expressed as follows:

$$\rho B_{x,y} = \frac{2 \times \overline{I}_{x,y}}{\overline{I}_{x-1,y-1} + \overline{I}_{x+1,y+1}} \text{ for } x = y,$$

$$\rho B_{x,y} = \frac{2 \times \overline{I}_{x,y}}{\overline{I}_{x-1,y+1} + \overline{I}_{x+1,y-1}} \text{ for } x \neq y,$$

where $\rho B_{x,y}$ is the blue-related ratio for the IR pixel (x, y), $\overline{I}_{x,y}$ is the preprocessed pixel value of the IR pixel (x, y), and $\overline{I}_{x-1,y-1}, \overline{I}_{x+1,y+1}, \overline{I}_{x-1,y+1}, \overline{I}_{x+1,y-1}$ are the preprocessed pixel values of the blue pixels (x−1, y−1), (x+1, y+1), (x−1, y+1), (x+1, y−1) positioned adjacent to the IR pixels (x, y).

Then, in the step S31, the image processor 200 calculates an average of the plurality of determined blue-related ratios to determine the local blue-related ratio $\rho B_{2,2}$ for the blue pixel (2,2) based on the following expression:

$$\overline{\rho B_{2,2}} = (\rho B_{1,1} + \rho B_{3,1} + \rho B_{1,3} + \rho B_{3,3}) \times 0.25.$$

Then, in the step S4, the image processor 200 estimates the infrared portion value $\widetilde{I_{2,2}}$ for the blue pixel (2,2), based on the above determined local blue-related ratio $\overline{\rho B_{2,2}}$, according to the following expression: $\widetilde{I_{2,2}} = \overline{I}_{2,2} \times \overline{\rho B_{2,2}}.$ The red-related ratios can be computed based on expressions similar to the above expressions used for calculating the blue-related ratios. Thus, the following expressions may be used to determine the blue-related ratios related to the IR pixels (x, y) positioned adjacent to a blue pixel (i,j):

$$\rho R_{x,y} = \frac{2 \times \overline{I}_{x,y}}{\overline{I}_{x-1,y-1} + \overline{I}_{x+1,y+1}} \text{ for } x = y,$$

$$\rho R_{x,y} = \frac{2 \times \overline{I}_{x,y}}{\overline{I}_{x-1,y+1} + \overline{I}_{x+1,y-1}} \text{ for } x \neq y,$$

where $\rho R_{x,y}$ is the blue-related ratio for the adjacent IR pixel (x,y), $\overline{I}_{x,y}$ is the preprocessed pixel value of the adjacent IR pixel (x, y), $\overline{I}_{x-1,y-1}, \overline{I}_{x+1,y+1}, \overline{I}_{x-1,y+1}, \overline{I}_{x+1,y-1}$ are the preprocessed pixel values of the blue pixels (x−1, y−1), (x+1, y+1), (x−1, y+1), and (x+1, y−1) positioned adjacent to the IR pixels (x, y).

Furthermore, the local red-related ratio $\overline{\rho R_{i,j}}$ for the blue pixel (i,j) based on the following expression:

$$\overline{\rho R_{i,j}} = (\rho R_{i-1,j-1} + \rho R_{i+1,j-1} + \rho R_{i-1,j+1} + \rho R_{i+1,j+1}) \times 0.25.$$

Optionally, the color-related ratios related to the IR pixels may be amplified, or possibly attenuated, for example by exponentiation using an amplification coefficient γ as exponent or power. Thus, the color-related ratios related to one IR pixel (x, y) can be raised to the power of the amplification coefficient γ to provide the amplified color-related ratios, which can be expressed as follows:

$$(\rho R_{x,y})^\gamma, (\rho G_{x,y})^\gamma, (\rho B_{x,y})^\gamma.$$

Such an amplification coefficient γ is used to control brightness intensity of the resulting infrared image extract $\widetilde{I}$.

The amplification coefficient γ may be more than 1 to increase the image contrast, which results in an infrared image that looks darker or less bright, or less than 1 to decrease the image contrast, which results in an infrared image that looks brighter.

The color pixels located on the border of the array 110, in other words close to the image border, do not have a full neighborhood of 5×5 pixels available. In that case, it is not possible to compute ratios based on adjacent and double-adjacent pixels. For that reason, any color pixel close to the image or pixel array border may inherit its color-related ratio from the closest color pixel of the same color, for which computation according to the step S3 was possible. For example, a green pixel close to an image border may inherit its green-related ratio from the closest green pixel. The same applies to the red and blue pixels near the image borders.

The present methods defined herein of generating an infrared image from all pixels of an RGB-IR sensor can be implemented by hardware and software. In an embodiment, the methods defined herein are implemented by a software application running on a processor, such as the image processor 200. Thus, the present disclosure also concerns a computer program comprising instructions which, when the program is executed by a computer, cause the computer to carry out the steps of the methods defined herein. The present disclosure also concerns a computer readable media (e.g., a non-transitory computer readable storage medium) comprising instructions that, when executed by a computer, cause the computer to carry out the steps of the methods defined herein.

Furthermore, the present methods defined herein could be applied to any image sensor having first IR pixels and at least second pixels having sensitivity to signals in a wavelength range, distinct or separate from the IR wavelength range. In particular, the image sensor may have a mix of IR pixels and color pixels. Each color pixel may be of one color channel, for example red, green, or blue, and the array of pixels may have color pixels of different color channels.

What is claimed is:

1. A method of generating an infrared image, comprising:
    processing pixel values provided at an output of an image sensor comprising a two-dimensional array of pixels including a mix of IR pixels and color pixels, wherein processing includes, for each color pixel:
        determining a local color-related ratio indicative of a part of infrared light reception in the color pixel; and
        estimating an infrared portion value from a color pixel value based on the local color-related ratio;
    generating an infrared image from pixel values from the IR pixels and the estimated infrared portion values from the color pixels;
    prior to processing the pixel values, first preprocessing including adjusting an infrared transmittance of the color pixels in the array of pixels to a target level; and
    second preprocessing performed after the first preprocessing, for each IR pixel, the second preprocessing including:
        determining color portion values, representative of the part of color light reception in the IR pixel, in all color channels, from the pixel value of said IR pixel and predetermined color-related IR contamination gain coefficients; and
        filtering the pixel value of said IR pixel by removing the determined color portion values.

2. The method according to claim 1, wherein determining the local color-related ratio for a color pixel includes deriving said local color-related ratio from the pixel values of at least one IR pixel positioned adjacent to said color pixel in the array of pixels.

3. The method according to claim 2, wherein determining the local color-related ratio for said color pixel includes deriving said local color-related ratio from the pixel values of one or more color pixels having the same color as said color pixel, and that are positioned adjacent to said at least one IR pixel in the array of pixels.

4. The method according to claim 1, wherein determining said local color-related ratio for said color pixel includes:
    determining a plurality of color-related ratios respectively related to a plurality of IR pixels positioned adjacent to said color pixel in the array of pixels; and
    averaging said plurality of color-related ratios.

5. The method according to claim 1, wherein estimating an infrared portion value for each color pixel includes applying the local color-related ratio to a pixel value of said color pixel.

6. The method according to claim 1, wherein adjusting the infrared transmittance of the color pixels to the target level includes applying color-related normalization factors to the color pixel values.

7. The method according to claim 6, wherein the color-related normalization factors are determined by:
    illuminating with an only infrared light signal a target that is monotonically reflective in a light spectrum from visible spectrum to infrared spectrum;
    receiving by the image sensor the infrared light signal reflected by said target;
    averaging all IR pixel values to determine a mean IR value;
    for each color channel, averaging all color pixel values to determine a mean color value; and
    calculating each color-related normalization factor by calculating the ratio between the mean IR value and the mean color value.

8. The method according to claim 1, wherein determining the color portion values for each IR pixel includes:
    for each color channel:
        determining a local color pixel value from at least one color pixel of said color channel positioned adjacent to said IR pixel; and
        filtering said local color pixel value by removing an infrared light reception part value that is estimated as equal to the pixel value of said IR pixel; and
    determining said color portion value of the IR pixel by applying a predetermined color-related IR contamination gain coefficient to said filtered local color pixel value.

9. The method according to claim 8, wherein of determining, for each color channel, a local color pixel value includes averaging the color pixel values of a plurality of color pixels positioned adjacent to said IR pixel.

10. The method according to claim 1, further comprising weighting said color portion values of each IR pixel by respective color-related intensity weights depending on detected light conditions in an environment of the image sensor.

11. The method according to claim 1, further comprising:
    determining the color-related IR contamination gain coefficient for each color channel by:
        illuminating a target that is monotonically reflective in a light spectrum from visible spectrum to infrared spectrum, with a monochromatic light signal of said color;

receiving by the image sensor the monochromatic light signal reflected by said target;

averaging all IR pixel values to determine a first mean color value;

averaging all color pixel values related to said color to determine a second mean color value; and calculating the color-related IR contamination gain coefficient by calculating the ratio between the first mean color value and the second mean color value.

12. An imaging system comprising:

an image sensor comprising a two-dimensional array of pixels including color pixels and IR pixels; and an image processor for processing pixel values provided at an output of the image sensor, the image processor configured to:

process the pixel values for each color pixel by:
determining a local color-related ratio indicative of a part of infrared light reception in the color pixel; and
estimating an infrared portion value from a color pixel value based on the local color-related ratio; and generate an infrared image from pixel values from the IR pixels and the estimated infrared portion values from the color pixels;

prior to processing the pixel values, perform a first preprocess including adjusting an infrared transmittance of the color pixels in the array of pixels to a target level;

perform a second preprocess, after the first preprocessing, for each IR pixel, the second preprocess including:
determining color portion values, representative of the part of color light reception in the IR pixel, in all color channels, from the pixel value of said IR pixel and predetermined color-related IR contamination gain coefficients; and
filtering the pixel value of said IR pixel by removing the determined color portion values.

13. The imaging system of claim 12, wherein the image processor is further configured to determine the local color-related ratio for a color pixel by deriving said local color-related ratio from the pixel values of at least one IR pixel positioned adjacent to said color pixel in the array of pixels.

14. The imaging system of claim 13, wherein the image processor is further configured to determining the local color-related ratio for said color pixel by deriving said local color-related ratio from the pixel values of one or more color pixels having the same color as said color pixel, and that are positioned adjacent to said at least one IR pixel in the array of pixels.

15. The imaging system of claim 13, wherein the image processor is further configured to determine the local color-related ratio for said color pixel by deriving said local color-related ratio from the pixel values of one or more color pixels having the same color as said color pixel, and that are positioned adjacent to said at least one IR pixel in the array of pixels.

16. The imaging system of claim 12, wherein the image processor is further configured to determine said local color-related ratio for said color pixel by:
determining a plurality of color-related ratios respectively related to a plurality of IR pixels positioned adjacent to said color pixel in the array of pixels; and
averaging said plurality of color-related ratios.

17. A non-transitory computer readable media comprising instructions that, when executed by a computer, cause the computer to:

process pixel values provided at an output of an image sensor comprising a two-dimensional array of pixels including a mix of IR pixels and color pixels, wherein each of the color pixels are processed by:
determining a local color-related ratio indicative of a part of infrared light reception in the color pixel; and
estimating an infrared portion value from a color pixel value based on the local color-related ratio;

generate an infrared image from pixel values from the IR pixels and the estimated infrared portion values from the color pixels; and prior to processing, perform a first preprocess including adjusting an infrared transmittance of the color pixels in the array of pixels to a target level by applying color-related normalization factors to the color pixel values, the color-related normalization factors being determined by:
illuminating with an only infrared light signal a target that is monotonically reflective in a light spectrum from visible spectrum to infrared spectrum;
receiving by the image sensor the infrared light signal reflected by said target;
averaging all IR pixel values to determine a mean IR value;
for each color channel, averaging all color pixel values to determine a mean color value; and
calculating each color-related normalization factor by calculating the ratio between the mean IR value and the mean color value.

* * * * *